US011405345B2

(12) United States Patent
Bernstein et al.

(10) Patent No.: US 11,405,345 B2
(45) Date of Patent: Aug. 2, 2022

(54) E-MAIL WITH SMART REPLY AND ROAMING DRAFTS

(71) Applicant: Microsoft Technology Licensing, LLC, Redmond, WA (US)

(72) Inventors: Ethan J. Bernstein, Sammamish, WA (US); Luciana S. Dantas, Sammamish, WA (US); Matthew D. Wood, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 993 days.

(21) Appl. No.: 15/436,951

(22) Filed: Feb. 20, 2017

(65) Prior Publication Data
US 2018/0124000 A1 May 3, 2018

Related U.S. Application Data

(60) Provisional application No. 62/415,915, filed on Nov. 1, 2016.

(51) Int. Cl.
*H04L 51/02* (2022.01)
*H04L 51/18* (2022.01)
*H04L 51/42* (2022.01)
*H04L 51/00* (2022.01)

(52) U.S. Cl.
CPC ............ *H04L 51/22* (2013.01); *H04L 51/02* (2013.01); *H04L 51/18* (2013.01); *H04L 51/16* (2013.01)

(58) Field of Classification Search
None
See application file for complete search history.

(56) References Cited

U.S. PATENT DOCUMENTS

| 7,194,510 | B2 | 3/2007 | Sherman et al. |
| 7,519,916 | B1 | 4/2009 | Hartwell et al. |
| 7,620,688 | B2 | 11/2009 | Warren et al. |
| 8,005,462 | B2 | 8/2011 | Roy |
| 8,386,563 | B2 | 2/2013 | Parks et al. |
| 8,560,623 | B2 | 10/2013 | Jensen et al. |
| 8,566,399 | B2 | 10/2013 | Ferguson |

(Continued)

FOREIGN PATENT DOCUMENTS

| CA | 2638460 A1 | 10/2007 |
| CN | 101842803 A | 9/2010 |
| CN | 205485733 U | 8/2016 |

OTHER PUBLICATIONS

"Non Final Office Action Issued in U.S. Appl. No. 16/349,493", dated Jan. 22, 2019, 11 Pages.

(Continued)

*Primary Examiner* — Mohamed Ibrahim
(74) *Attorney, Agent, or Firm* — Christopher J. Volkmann; Kelly, Holt & Christensen, PLLC

(57) ABSTRACT

An electronic mail computing system has a smart reply system that that enables a smart reply feature that surfaces a user input mechanism that allows a user to reply to an e-mail message without downloading full content of the e-mail message to the user's client computing system. A draft roaming system interacts with the client computing system to allow a plurality of different user devices to access a draft electronic mail message, and interacts with the smart reply system so a draft can be generated using the smart reply feature.

20 Claims, 16 Drawing Sheets

(56) References Cited

U.S. PATENT DOCUMENTS

| | | | |
|---|---|---|---|
| 8,572,028 | B2 | 10/2013 | Witriol et al. |
| 8,893,129 | B1 | 11/2014 | Havemose |
| 8,990,313 | B2 | 3/2015 | Sawhney |
| 8,990,345 | B2 | 3/2015 | Isaac et al. |
| 9,148,302 | B2 | 9/2015 | Tysowski et al. |
| 9,166,802 | B2 | 10/2015 | Lovell |
| 9,166,941 | B2 | 10/2015 | Glickstein et al. |
| 9,380,010 | B2 | 6/2016 | Bastide et al. |
| 9,426,102 | B1 | 8/2016 | Wong et al. |
| 2002/0099775 | A1 | 7/2002 | Gupta et al. |
| 2002/0199024 | A1 | 12/2002 | Givoly et al. |
| 2003/0005051 | A1 | 1/2003 | Gottlieb |
| 2004/0044735 | A1 | 3/2004 | Hoblit |
| 2005/0033863 | A1 | 2/2005 | Tosey |
| 2005/0039048 | A1 | 2/2005 | Tosey |
| 2005/0193067 | A1* | 9/2005 | Ferguson ............ G06Q 10/107 709/206 |
| 2006/0080354 | A1 | 4/2006 | Berger et al. |
| 2007/0005717 | A1 | 1/2007 | LeVasseur et al. |
| 2007/0094334 | A1* | 4/2007 | Hoffman ............ G06Q 10/107 709/206 |
| 2009/0300121 | A1* | 12/2009 | Bartlett ............... G06Q 10/107 709/206 |
| 2011/0191429 | A1 | 8/2011 | Tu et al. |
| 2012/0124142 | A1 | 5/2012 | Kroeger et al. |
| 2012/0290669 | A1 | 11/2012 | Parks et al. |
| 2013/0054734 | A1 | 2/2013 | Bond et al. |
| 2013/0111550 | A1* | 5/2013 | Naveh ..................... G06F 9/468 726/3 |
| 2013/0318176 | A1 | 11/2013 | Claux et al. |
| 2014/0108350 | A1 | 4/2014 | Marsden |
| 2014/0156597 | A1 | 6/2014 | Hakami et al. |
| 2014/0258412 | A1 | 9/2014 | Li et al. |
| 2015/0100644 | A1 | 4/2015 | Gulik |
| 2015/0142981 | A1 | 5/2015 | Gonzales et al. |
| 2015/0149502 | A1* | 5/2015 | Rao ..................... G06Q 10/107 707/770 |
| 2015/0302334 | A1 | 10/2015 | Thomas et al. |
| 2016/0036923 | A1 | 2/2016 | Phanishayee et al. |
| 2016/0050177 | A1 | 2/2016 | Cue et al. |
| 2016/0277496 | A1 | 9/2016 | Zeng et al. |
| 2017/0006356 | A1 | 1/2017 | Krasadakis |

OTHER PUBLICATIONS

"Non Final Office Action Issued in U.S. Appl. No. 15/362,929", dated Feb. 7, 2019, 12 Pages.

"Final Office Action Issued in U.S. Appl. No. 15/362,929", dated May 6, 2019, 9 Pages.

"Non Final Office Action issued in U.S. Appl. No. 15/349,493", dated May 31, 2019, 16 Pages.

"First Office Action and Search Report Issued in Chinese Patent Application No. 201780067351.6", dated Dec. 28, 2020, 16 Pages.

"Office Action Issued in Chinese Patent Application No. 201780067351. 6", dated Sep. 6, 2021, 11 Pages.

"Office Action issued in European Patent Aoplication No. 17795175. 3", dated Apr. 6, 2020, 8 Pages.

"Second Office Action Issued in Chinese Patent Application No. 201780067351.6", dated Jun. 3, 2021, 15 Pages.

"Non Final Office Action Issued in U.S. Appl. No. 15/362,929", dated Feb. 21, 2020, 8 Pages.

"Office Action Issued in European Patent Application No. 17795175. 3", dated Oct. 20, 2021, 4 Pages.

"Final Office Action Issued in U.S. Appl. No. 15/362,929", dated Aug. 4, 2020, 11 Pages.

"Office Action Issued in European Patent Application No. 17795175. 3", dated Dec. 16, 2020, 5 Pages.

"Draft Folder Only Syncs One Way on iOS Device", https://support.appriver.com/kb/a946/draft-folder-only-syncs-one-way-on-ios-device.aspx, Published on: Feb. 4, 2015, 1 pages.

"How to remove email threads from Outlook quickly?", https://web.archive.org/web/20140818080906/http:/www.extendoffice.com/documents/outlook/1753-outlook-delete-email-threads.html, Published on: Aug. 18, 2014, 3 pages.

"Download POP3 email account headers and messages", https://support.office.com/en-us/article/Download-POP3-email-account-headers-and-messages-39082d5a-6141cfd-8920-dc9552c71f29, Retrieved on: Nov. 3, 2016, 7 pages.

"Apple's iPhone & Making Mobile Email work well using IMAP", In White paper Isode, Mar. 23, 2009, 12 pages.

"How do I migrate email to google apps for work?", https://mediatemple.net/community/products/googleapps/204645550/how-do-i-migrate-email-to-google-apps-for-work, Retrieved on: Nov. 7, 2016, 6 pages.

Lin, et al., "Migrate an enterprise web app to Azure App Service", https://azure.microsoft.com/en-us/documentation/articles/web-sites-migration-from-iis-server/, Published on: Jan. 7, 2016, 10 pages.

"How to migrate old Sync (Weave) account/login to the new Sync service?", https://support.mozilla.org/en-US/questions/1006036, Published on: Jun. 13, 2014, 3 pages.

"Setup Outlook.com email using Windows Live/Hotmail/MSN settings? ", https://supportforums.blackberry.com/t5/BlackBerry-OS-Smartphones/Setup-Outlook-com-email-using-Windows-Live-Hotmail-MSN-settings/td-p/20807369, Published on: Apr. 3, 2014, 2 pages.

"International Search Report and Written Opinion Issued in PCT Application No. PCT/US2017/058639", dated Jan. 22, 2018, 13 Pages.

\* cited by examiner

E-MAIL WITH SMART REPLY AND ROAMING DRAFTS

CROSS-REFERENCE TO RELATED APPLICATION

The present application is based on and claims the benefit of U.S. provisional patent application Ser. No. 62/415,915, filed Nov. 1, 2016, the content of which is hereby incorporated by reference in its entirety, and is related to co-pending U.S. application Ser. No. 15/349,493, filed Nov. 11, 2016 and U.S. application Ser. No. 15/362,929, filed Nov. 29, 2016.

BACKGROUND

Computer systems are currently in wide use. Some such computer systems host services that are accessed by client computing systems.

Hosted services can take a wide variety of different forms. For instance, some hosted services host a suite of applications, such as an electronic mail application, a calendar application, task and contact applications, etc. The hosted services can be accessed by client components of the hosted services that reside on a client machine. For instance, a client component may surface user interface functionality that allows a user to perform calendar functions (such as to schedule appointments, etc.), email functions (such as to prepare and send e-mail messages, receive e-mail messages, manage folders in an e-mail system, manage filters, etc.), add, delete and modify contact information, among a wide variety of other things.

When the user performs these operations, the client component generates data that is synchronized to the remote server environment in which the service is deployed. Similarly, the remote server environment may need to synchronize data from its environment to the client. By way of example, if the hosted service is an electronic mail service, and the user has received new messages from other e-mail users, the service will synchronize that information down to the client computing system, the next time the user logs into the e-mail service.

Some hosted electronic mail services provide a draft roaming feature. This feature allows a user to begin drafting an e-mail message and, before the user is finished, save it as a draft. The user may then use a different device to log into the e-mail system at a later time. When the user does this, the e-mail service provides the user with access to the draft, even though the user is accessing the e-mail service through a different device than the one on which the draft was begun. Providing this type of access (through different devices) to draft e-mail messages that a user began on a different device is referred to as a draft roaming feature.

Some e-mail messages are part of a very lengthy thread, which can include a large number of other messages. Similarly, some e-mail messages have rather large attachments. A smart reply feature allows a user to reply to an e-mail message without loading the entire or full content corresponding to the e-mail message, onto the user device through which the user is accessing the service and generating the reply. By way of example, a user may receive an e-mail message that has a large attachment. The user may wish to simply forward that message to a different user, along with the attachment. A smart reply feature maintains the full e-mail message at the service (the body of the e-mail message and the associated attachment) and allows the user to generate a forwarding message, including a message body that has the text that the user inputs. When the user sends that message, the service will automatically attaches the attachment to the forwarding message, and sends it to the recipient. Thus, the user never needs to download the entire attachment in order to generate and send a reply. The same is true of a lengthy e-mail thread. That is, using a smart reply feature, the user need not download the entire e-mail thread in order to reply to or forward a message in that thread. Instead, the service maintains the full e-mail thread and receives the new content of the reply message from the user, and then attaches the full e-mail thread before sending it on to the recipient.

In addition, the synchronization mechanisms in such services often use a particular protocol in order to synchronize content between the service and client devices. When a new synchronization mechanism is deployed, it often uses a different protocol, which is incompatible with the protocol from the previous synchronization mechanism. As one example, when a first synchronization mechanism is used to synchronize data between a service and client systems, it may identify the objects that are synchronized (e.g., the e-mail messages, calendar events, contacts, etc.) using a first type of object identifying mechanism. However, a second synchronization mechanism may use a different type of object identifying mechanism in order to identify those objects. Therefore, if a service is running with the first synchronization mechanism, but wishes to change or upgrade to the second synchronization mechanism, that process often requires the service to synchronize all of the application data with the second mechanism, even though much of it has already been synchronized with the first mechanism. This can take a great deal of time, and cause disruption in the user experience.

Further, some services synchronize data between the service and a client component, upon a user logging into the service. For instance, when a user logs onto his or her e-mail service, the service may, at that time, begin synchronizing the user's inbox from the service to the client device. The synchronization mechanism can be fairly complex. For instance, it may first need to identify the differences between the inbox representations on the client system and the service. This can include enumerating all objects in the inbox of both systems and comparing them to identify items that need to be synchronized. Regardless of the particular synchronization mechanism that is used, it can be relatively computationally expensive and it can be relatively time consuming.

The discussion above is merely provided for general background information and is not intended to be used as an aid in determining the scope of the claimed subject matter.

SUMMARY

An electronic mail computing system has a smart reply system that that enables a smart reply feature that surfaces a user input mechanism that allows a user to reply to an e-mail message without downloading full content of the e-mail message to the user's client computing system. A draft roaming system interacts with the client computing system to allow a plurality of different user devices to access a draft electronic mail message, and interacts with the smart reply system so a draft can be generated using the smart reply feature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
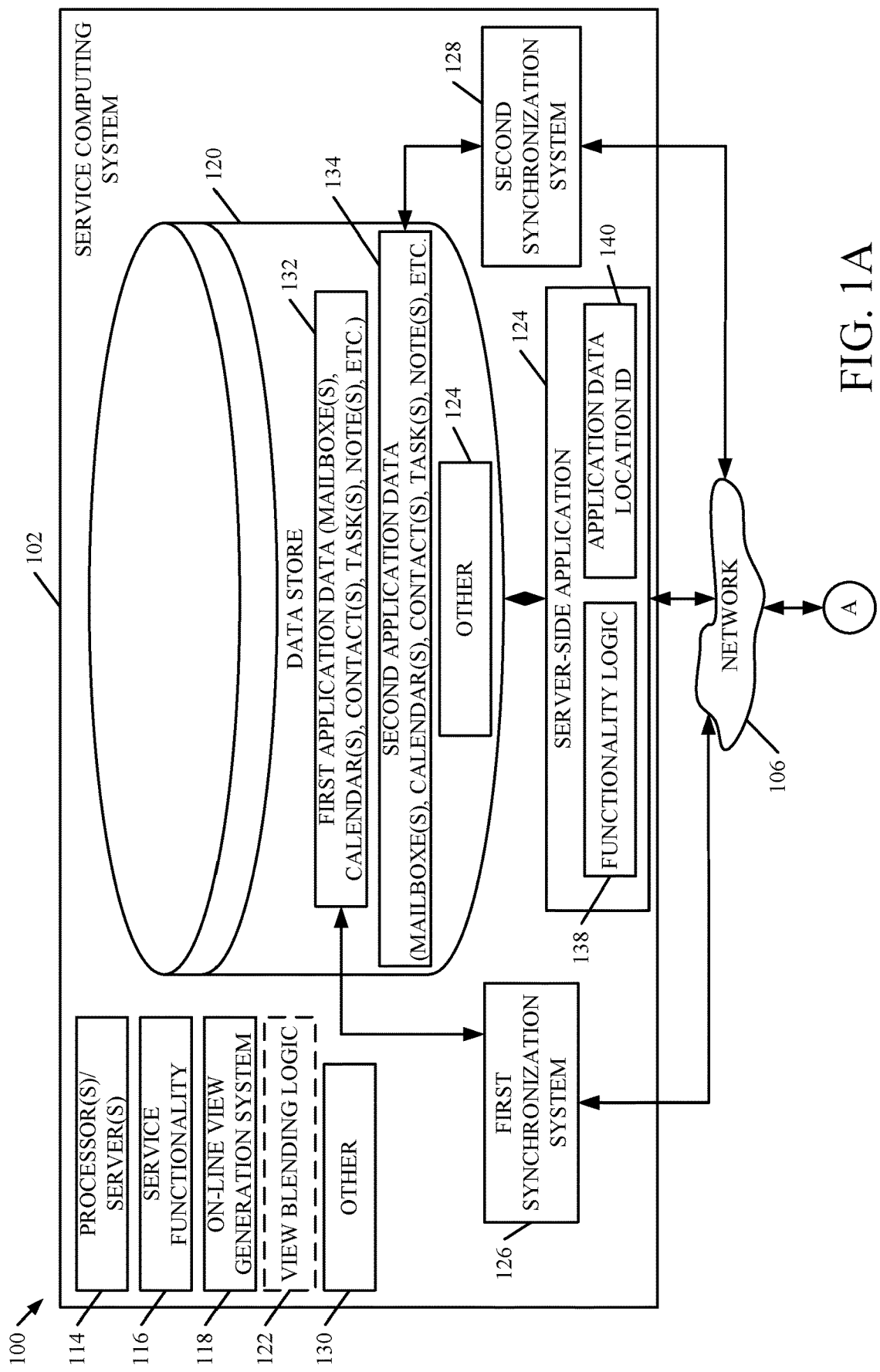
FIGS. 1A and 1B (collectively referred to herein as FIG. 1) show a block diagram of one example of a computing system architecture.
Figure 1B:
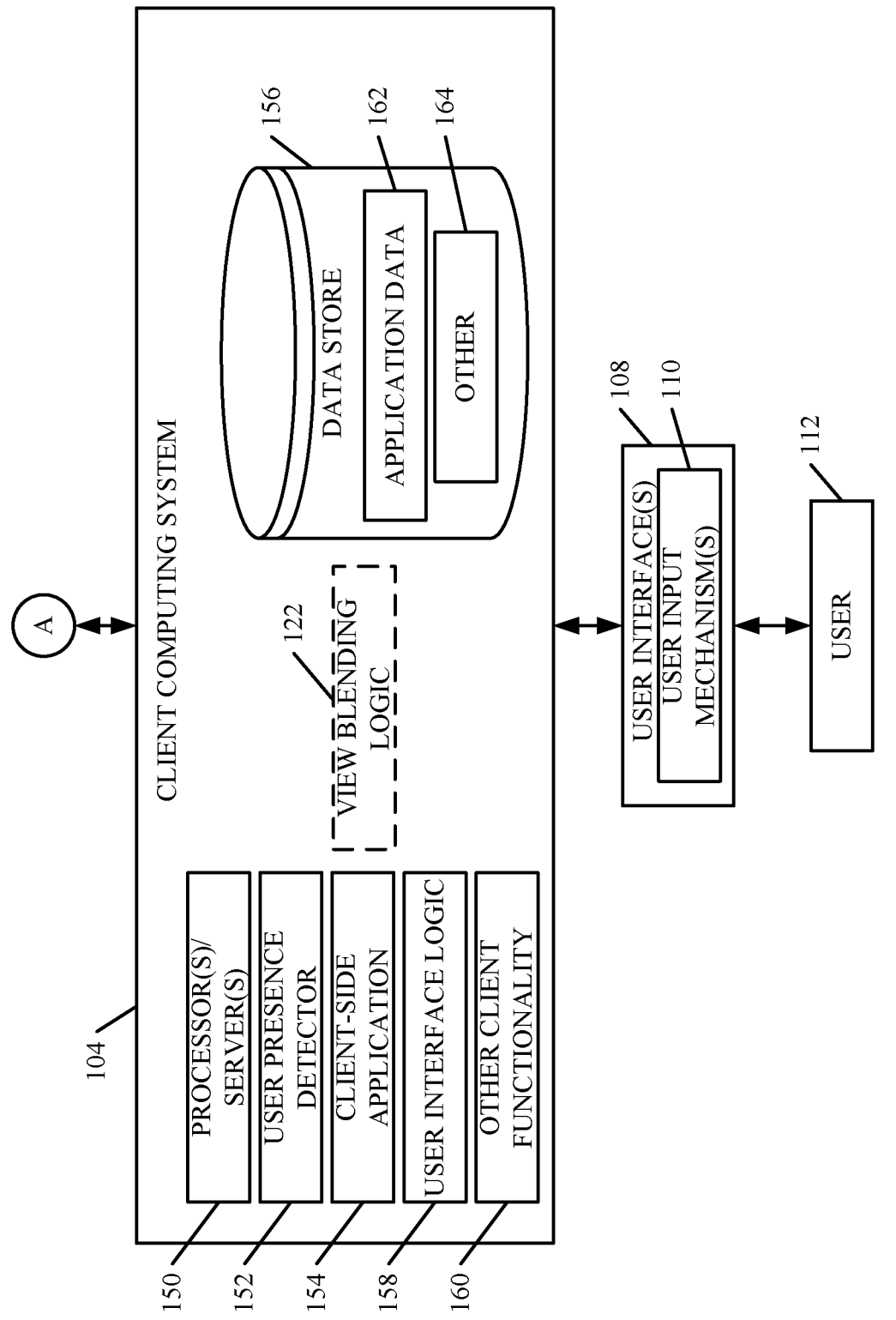

FIGS. 1A and 1B (collectively referred to herein as FIG. 1) show a block diagram of one example of a computing system architecture 100. Architecture 100 includes service computing system 102 and client computing system 104 that communicate with one another over network 106. Network 106 can be any of a wide variety of different types of networks, such as a wide area network, a local area network, etc.

In one example, service computing system 102 hosts a service that is accessed by client computing system 104. Client computing system 104 thus generates user interfaces 108 with user input mechanisms 110 for interaction by user 112. User 112 illustratively interacts with user input mechanisms 110 in order to control and manipulate client computing system 104 and ultimately service computing system 102. Before describing the overall operation of architecture 100 in more detail, a brief description of some of the items in architecture 100, and their operation, will first be provided.

FIG. 1 shows that, in one example, service computing system 102 includes processors or servers 114, service functionality 116, on-line view generation system 118, data store 120, view blending logic 122, (which is shown in ghost on system 102 and on client computing system 104 because it can reside either place) server side application 124, first synchronization system 126, second synchronization system 128, and it can include other items 130. Data store 120, itself, can include first application data 132, second application data 134, and it can include other items 136. Server side application 124 can include functionality logic 138, application data location identifier 140, and it can also include other items.

Service functionality 116 illustratively includes logic and functionality that performs functions and operations to implement the hosted service or server side application 124. Therefore, functionality 116 can manage virtual machines or hardware or other software components. It can also perform a wide variety of other functions to host server side application 124. On-line view generation system 118 will be described in greater detail below with respect to FIGS. 4 and 5. Briefly, it illustratively generates an on-line, truncated view of data when a user logs onto the service. This can be displayed to the user while a synchronization system (such as first or second synchronization system 126 or 128, respectively) begin synchronizing data between the service and the client system. Once the synchronized data is ready, a view of the synchronized data can be used to replace the on-line view.

View blending logic 122 illustratively manages the operation of first displaying the on-line view of the relevant data, and then displaying the synchronized view, once it is ready. This can be done in a variety of different ways, and this is also described in more detail below with respect to FIGS. 4 and 5.

Server side application 124 illustratively includes functionality logic 138 that implements the functionality of the server side application. For instance, where application 124 is an electronic mail (e-mail) application, then logic 138, in conjunction with service functionality 116, can implement e-mail functionality that allows users to access the e-mail application and perform e-mail functions. Where application 124 is a calendaring application, then functionality 138, in conjunction with functionality 116, allows the user to access the calendaring functions and perform different calendaring tasks. These are examples only and a wide variety of other services can be embodied in server side application 124.

Application data location identifier 140 illustratively identifies, for application 124, where it is to access application data in data store 120. For instance, service computing system 102 may be using a first synchronization system 126 that synchronizes data between client computing system 104 and data store 120 in service computing system 102 according to a first protocol. It may do that by synchronizing first application data 132 which may be, for instance, user mailboxes, calendars, contact lists, tasks, notes, etc. In that case, application data location identifier 140 will identify the location of first application data 132 in data store 120. It will of course be understood that data store 120 can be local to computing system 102 or it can be located elsewhere. In addition, it can be located at multiple different locations.

Regardless, it may be that service computing system 102 wishes to change (or upgrade) to synchronizing data with a second synchronization system 128 that synchronizes data between client computing system 104 and service computing system 102 according to a second protocol. Therefore, as is described in more detail below with respect to FIGS. 2 and 3, second synchronization system 128 may begin synchronizing data, as second application data 134, even while first synchronization system 126 is still performing synchronization operations to support server side application 124. When second synchronization system 128 has synchronized sufficient data, then it can change application data location identifier 140 to point to second application data 134 so that server side application 124 begins operating off second application data 134, instead of first application data 132. When second synchronization system 128 has synchronized all of the first application data 132, then that data can be deleted and first synchronization system 126 can be removed from service computing system 102 as well.

Client computing system 104, in the example shown in FIG. 1, illustratively includes one or more processors or servers 150, user presence detector 152 (which can also be located on service computing system 102), client side application 154, data store 156, user interface logic 158, and it can include a wide variety of other client functionality 160. User presence detector 152 can detect a number of different things on client computing system 104 to determine whether user 112 is present (at least whether the user is present with respect to the service side application 124 hosted by service computing system 102). For instance, detector 152 can detect whether the user is logged into the service, whether the user has recently used the service, whether the user has used other items on client computing system 104, etc. It illustratively outputs a signal indicative of whether the user 112 is present.

Client side application 154 can be a client component of server side application 124. Therefore, it can use user interface logic 158 to surface user interfaces 108 with user input mechanisms 110 that allow user 112 to access both the client side application 154, and server side application 124. In doing so, it can generate application data 162, and other data 164. For instance, user 112 can use client side application 154 to generate an appointment on the user's calendar. This may be stored as application data 162. The synchronization system being used by computing system 102 then synchronizes that data to data tore 120 so that it can be used by server side application 124 as well.

Figure 2:
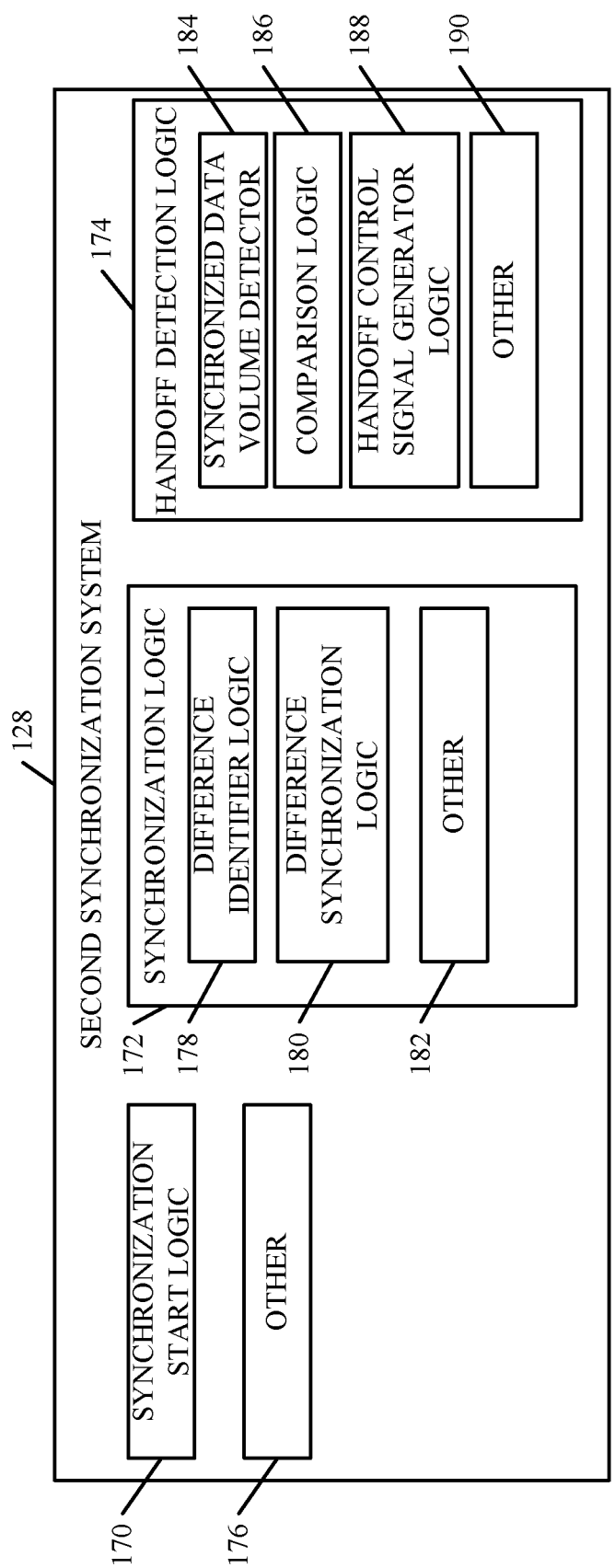
FIG. 2 is a block diagram showing one example of a second synchronization system in more detail.

FIG. 2 is a block diagram showing one example of second synchronization system 128, in more detail. In one example, it includes synchronization start logic 170, synchronization logic 172, handoff detection logic 174, and it can include a wide variety of other items 176. Synchronization start logic 170 illustratively detects when second synchronization system 128 is to synchronize data between service computing system 102 and client computing system 104. Synchronization logic 172 illustratively performs the actual synchronization operations. It can include difference identifier logic 178, difference synchronization logic 180, and other items 182. Difference identifier logic 178 identifies differences in the application data 162 and the application data stored on data store 120. Difference synchronizer logic 180 illustratively performs operations to synchronize that data between service 102 and client computing system 104.

Handoff detection logic 174 can be used to detect when the handoff should occur between first synchronization system 126 and second synchronization system 128, in a scenario where service computing system 102 is in the process of switching from using first synchronization system 126 to using second synchronization system 128. In one example, logic 174 includes synchronized data volume detector 184, comparison logic 186, handoff control signal generator logic 188 and it can include other items 190.

Synchronized data volume detector 184 detects a volume of application data that has been synchronized using second synchronization system 128. The volume can be an overall aggregate volume of data, or it can detect when certain key portions of data have been synchronized. For instance, when the server side application 124 is an e-mail application, it may detect when the user's last week of e-mail messages have been synchronized. When server side application 124 is a calendar application, logic 184 may detect when the current month on the user's calendar, the previous month, and the next month, have all been synchronized. Detector 184 may detect when other criteria are met as well. Comparison logic 186 compares the detected volume (or detected other criteria) and compares them to a threshold value which is to be met before server side application 124 is handed off so that it operates on the second application data 184, instead of the first application data 132. Handoff control signal generator logic 188 generates a control signal to adjust the application data location identifier 140 so that it now identifies second application data 134 instead of first application data 132. This is discussed in greater detail below with respect to FIG. 3.

Figure 3A:
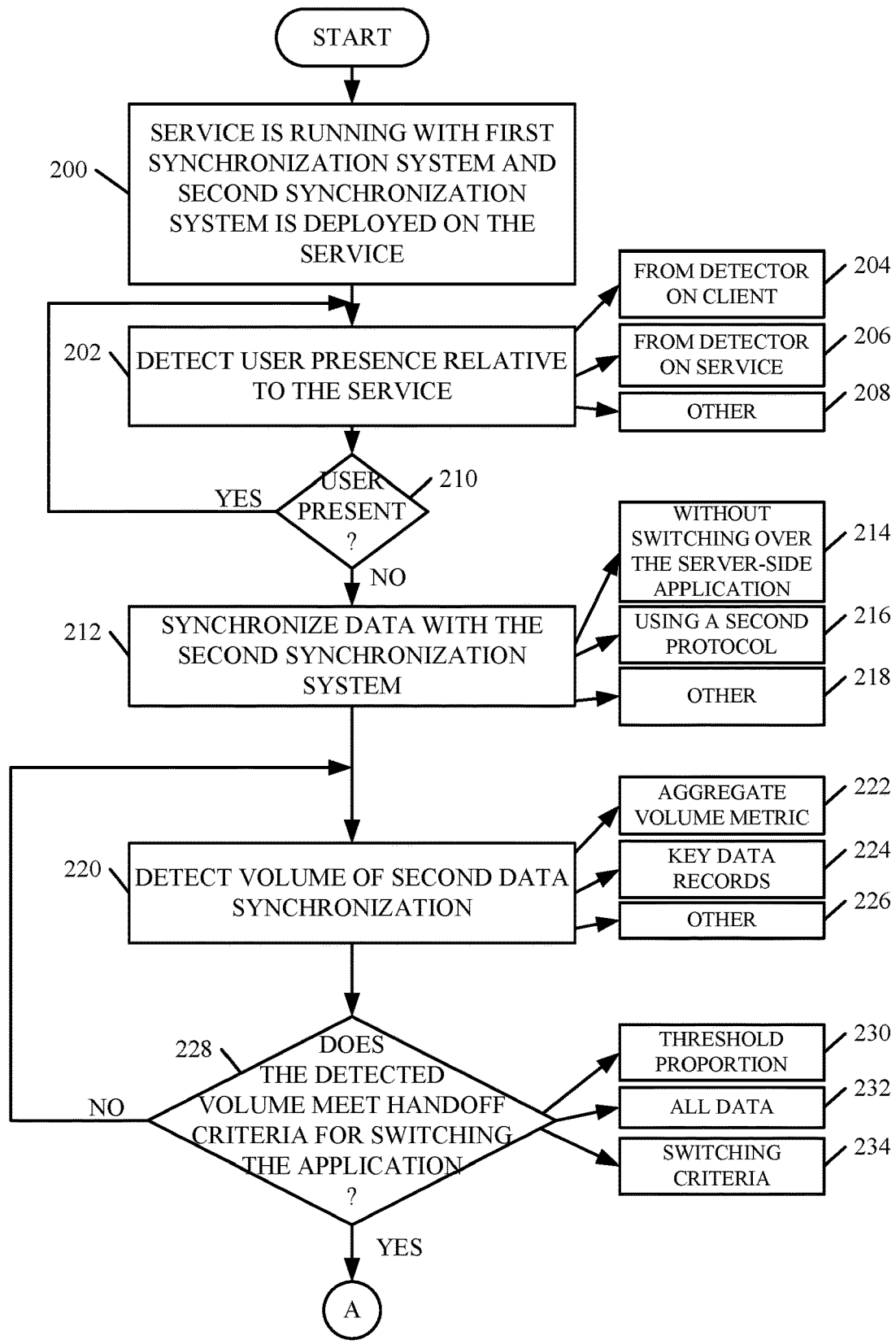
FIGS. 3A and 3B (collectively referred to herein as FIG. 3) show a flow diagram illustrating one example of the operation of the architecture shown in FIG. 1 in switching between first and second synchronization systems.
Figure 3B:
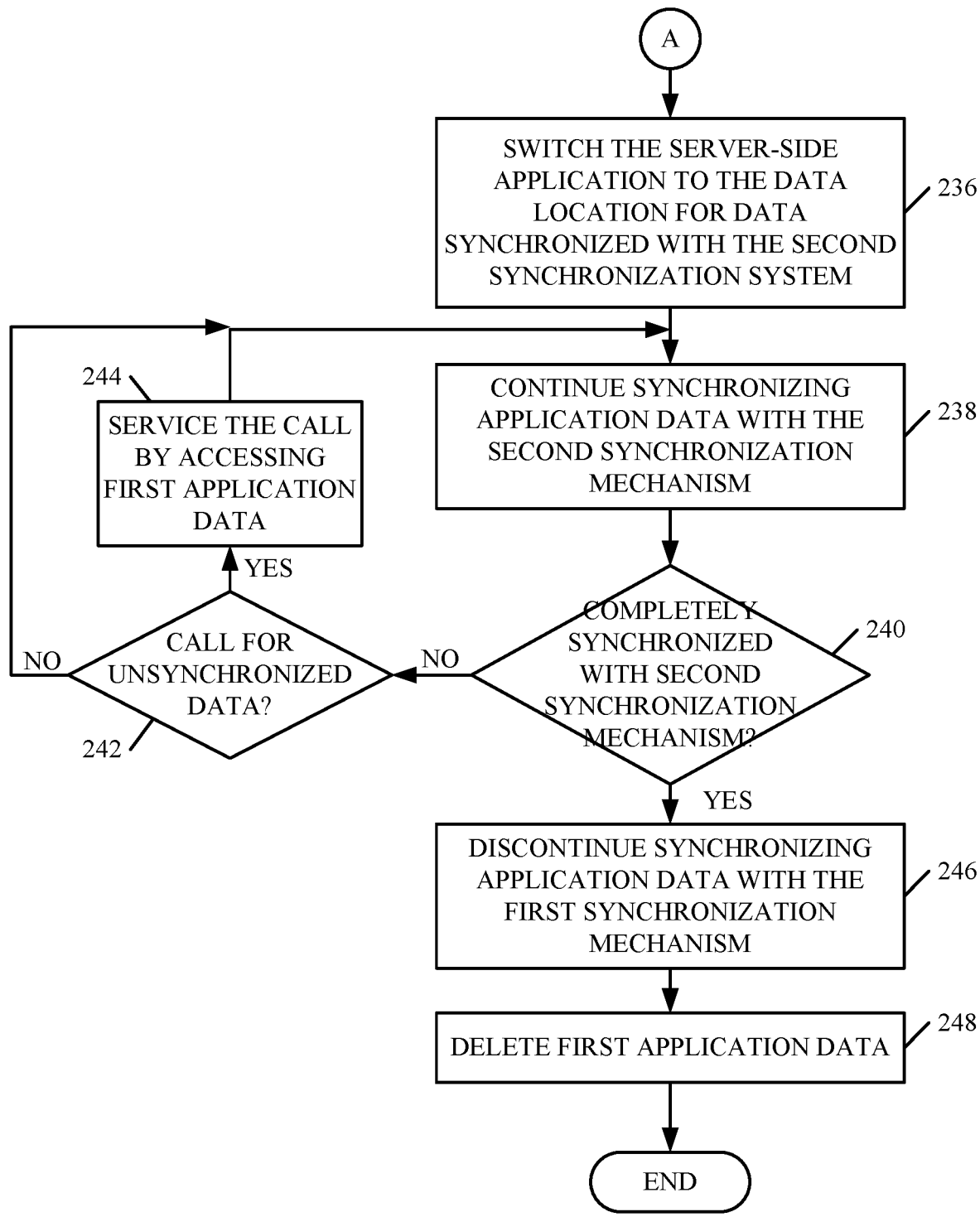

FIGS. 3A and 3B (collectively referred to herein as FIG. 3) show a flow diagram illustrating one example of the operation of architecture 100, and second synchronization system 128, in synchronizing data and controlling server side application 124 to switch between using first application data 132 that was synchronized using first synchronization system 126, and second application data 134 that was synchronized using second synchronization system 128. In doing so, it is first assumed that the service is running with first synchronization system 126 synchronizing first application data 132, and that server side application 124 is using first application data 132 to service requests from the various client computing systems. It is also assumed that the second synchronization system 128 is deployed on the service computing system 102. This is indicated by block 200 in the flow diagram of FIG. 3. Sync start logic 170 then detects the user presence as indicated by user presence detector 152. This is indicated by block 202. This, as described above, can be detected from a detector 152 on client computing system 104, as indicated by block 204, or from a detector on service computing system 102, as indicated by block 206. It can be detected in other ways as well, and this is indicated by block 208.

In one example, second synchronization system 128 does not begin synchronizing the application data according to the second protocol while the user is present. Therefore, if the user is not present, as indicated by block 210, then second synchronization system 128 begins synchronizing second application data 134. This is indicated by block 212.

In doing so, it does not yet switch over server side application 124 to begin using second application data 134. This is indicated by block 214. As mentioned above, it synchronizes the data using a second synchronization protocol as indicated by block 216. It can synchronize the data in other ways as well, and this is indicated by block 218.

At some point, synchronized data volume detector 184 detects a volume (or other characteristic) of the data synchronized. This is indicated by block 220. Again, this can be an aggregate volume metric that identifies the aggregate volume of application data that has been synchronized by second synchronization system 128. This is indicated by block 222 in the flow diagram of FIG. 3. It can also detect whether key data records have been synchronized, as discussed above. This is indicated by block 224. It can detect the volume or other attributes of the data that have been synchronized in other ways as well, and this is indicated by block 226.

Comparison logic 186 then determines whether the detected volume meets handoff criteria for switching the application 124 from using first application data 132 to using second application data 134. This is indicated by block 228 in the flow diagram of FIG. 3. If not, processing returns to block 212 where second synchronization system 128 continues to synchronize data. The handoff criteria can take a variety of different forms. For instance, it can be a threshold proportion of the application data as indicated by block 230.

The criteria can be that all of the application data be synchronized as indicated by block 232. It can be a wide variety of other handoff criteria 234, as indicated by block 234.

Once the detected data that has been synchronized by second synchronization system 128 meets the handoff criteria, then handoff control signal generator logic 188 generates a control signal to switch the server side application 124 to using data at the data location for the second application data 134 synchronized using the second synchronization system. This is indicated by block 236 in the flow diagram of FIG. 3. Second synchronization system 128 continues to synchronize application data, as indicated by block 238.

Until all of the application data has been completely synchronized by second synchronization system 128, it may be that server side application 124, even though it is using second application data 134, will receive a call for data that has not yet been synchronized by second synchronization system 128. This is indicated by blocks 240 and 242 in the flow diagram of FIG. 3. When this occurs, then second synchronization system 128 directs server side application 124 to service the call by accessing first application data 132. This is indicated by block 244 in the flow diagram of FIG. 3.

Once all of the application data has been synchronized by second synchronization system 128, then service computing system 102 discontinues synchronizing data with first synchronization system 126. This is indicated by block 246 in flow diagram of FIG. 3. It then deletes the first application data 132. This is indicated by block 248.

In doing this, it can be seen that second synchronization system 128 begins synchronizing data, without the user ever knowing it. The server side application is not switched over to using that synchronization data, until the service calls can most likely be serviced from the data synchronized by second synchronization system 128. All the while, second synchronization system 128 continues to synchronize the application data, until it is all synchronized, at which point the service can then run using only second synchronization system 128 to synchronize the data. This allows switching to a different synchronization system to obtain all the benefits of such a system, even if it uses a different synchronization protocol, substantially invisible to the user.

Figure 4:
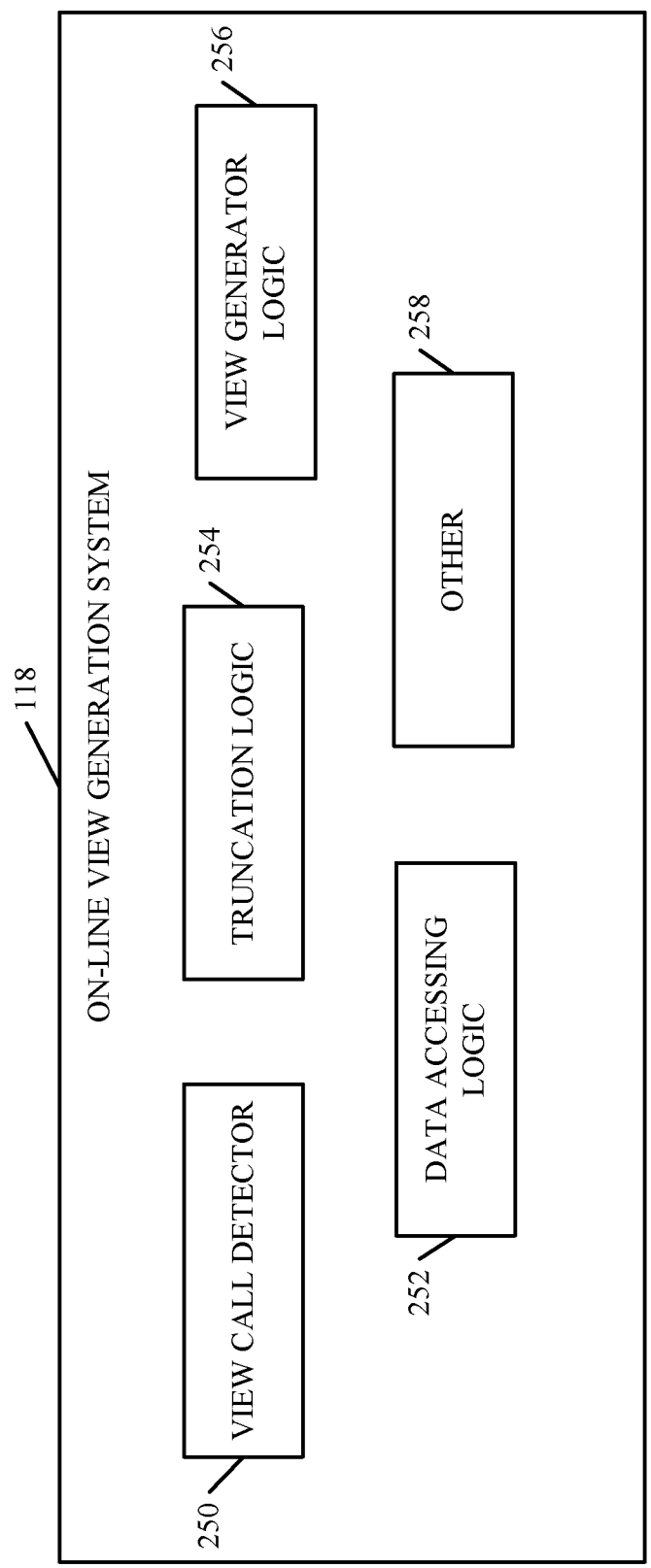
FIG. 4 is a block diagram showing one example of an on-line view system in more detail.

FIG. 4 is a block diagram showing one example of on-line view generation system 118 in more detail. In one example, it includes a view call detector 250, data accessing logic 252, truncation logic 254, view generator logic 256, and it can include other items 258. View call detector 250 detects when a call for a view of data has been made to server side application 124. For instance, when application 124 is an e-mail system, the user 112 may log into the system and, at that point, a call to see the user's inbox may be generated by client computing system 104.

Data accessing logic 252 then accesses the relevant portion of the application data in data store 120 that is to be surfaced for the view. Truncation logic 254 truncates that data and view generator logic 256 generates a view of the truncated data so that it can be immediately handed to client computing system 104 for display to user 112. It will be noted that on-line view generation system 118 does not wait for data to be synchronized between client computing system 104 and service computing system 102, in order to generate the view. For instance, it may simply take a view of the user's inbox from the data store 120 in service computing system 102, before that data is synchronized with the data in client computing system 104. In this way, at least the client will see the version of the inbox stored on service computing system 102, very quickly. At the same time, the synchronization system will be synchronizing data in the client computing system 104 with data in the service computing system 102 and when the synchronized data is ready, a view of the synchronized data can be generated and that view can replace the on-line view that shows only the view of the data from the service computing system data, before it is synchronized.

Figure 5:
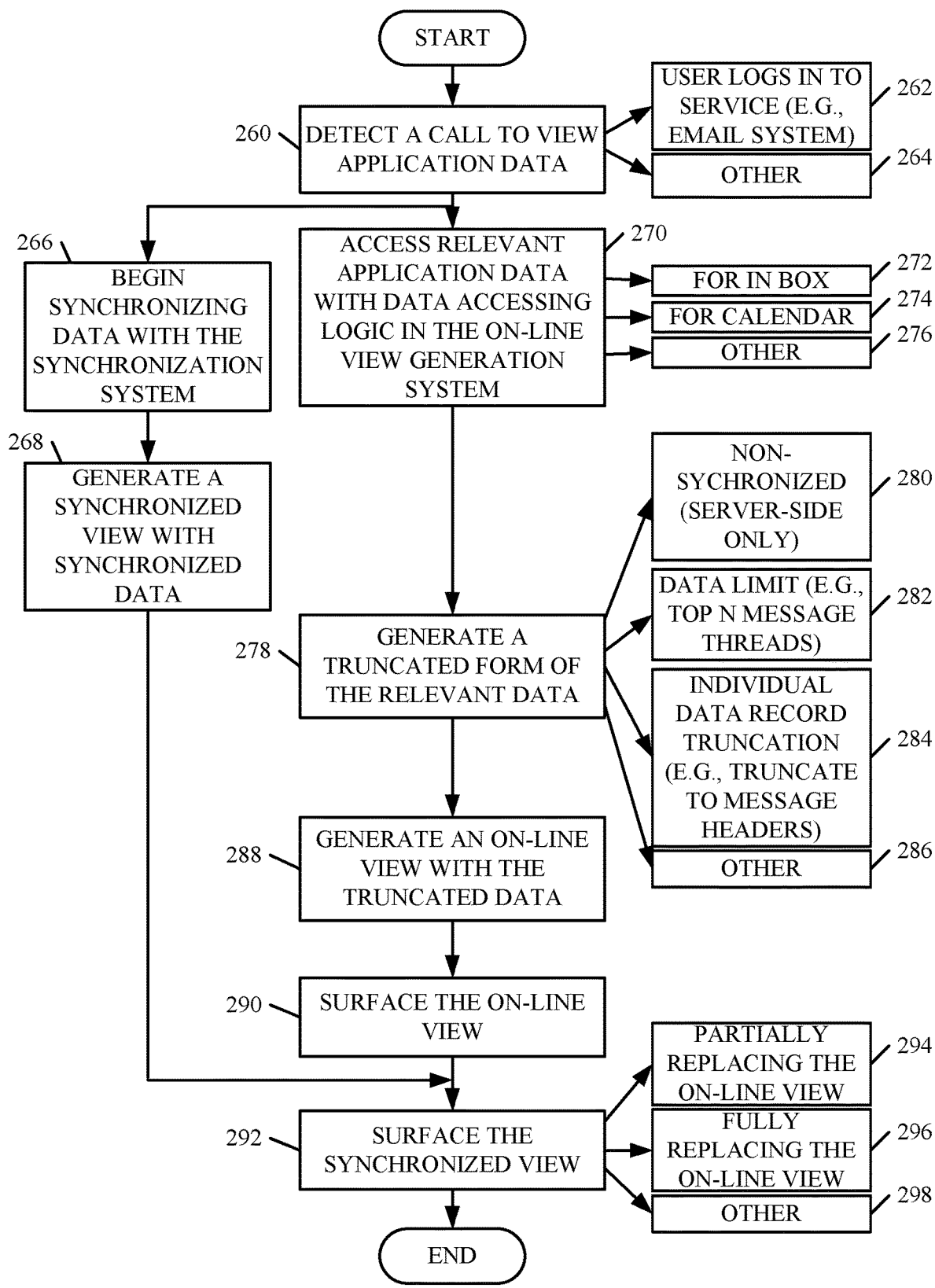
FIG. 5 is a flow diagram illustrating one example of the operation of the system shown in FIG. 4 in surfacing an on-line view and a synchronized view.

FIG. 5 is a flow diagram illustrating one example of this operation. View call detector 250 first detects a call to view application data. This is indicated by block 260 in the flow diagram of FIG. 5. This can occur, as mentioned above, when the user logs into the service (such as the user's e-mail system). This is indicated by block 262. It can be detected in other way as well, and this is indicated by block 264.

At that point, the synchronization system on service computing system 102 (for purposes of the present discussion, it will be assumed that it is second synchronization system 128) begins synchronizing the application data 162 on client computing system 104 with the second application data 134 on service computing system 102. This is indicated by block 266. Once the data has been synchronized, it generates a synchronized view showing the synchronized data. This is indicated by block 268.

While system 128 is synchronizing the data, data accessing logic 252 accesses the relevant application data 134. This is indicated by block 270. Depending on the particular application 124, this may be data for the user's inbox 272, for the user's calendar 274, or a wide variety of other data 276.

Truncation logic 254 generates a truncated form of the relevant data. This is indicated by block 278. Again, the truncated view will be of only non-synchronized data (e.g., server side only data that has not been synchronized service the current call was made to view the data). This is indicated by block 280. The truncated view can include a data limit (such as the top N message threads in the user's inbox). This is indicated by block 282. It can include individual data record truncation, (such as truncating a message thread to only the message headers). This is indicated by block 284. The truncation can take a wide variety of other forms as well, and this is indicated by block 286.

View generator logic 156 then generates an on-line view with the truncated data. This is indicated by block 288. For example, the view may be a view of the user's inbox showing only the message thread headers, instead of additional message content. It will be noted that the views can be generated on the client system or on the service.

System 118 then uses view blending logic 122 to surface the on-line view, through client side application 154, for user 112. Again, it will be noted that logic 122, and thus the view blending, can take place either on system 102 or on system 104. This is indicated by block 290 in the flow diagram of FIG. 5.

Once the synchronized view is generated, however, view blending logic 122 surfaces the synchronized view. This is indicated by block 292. For instance, as data items in the user's inbox are synchronized, that portion of the on-line view can be replaced by a view of the synchronized data. This is indicated by block 294. In another example, the entire inbox is synchronized before the synchronized view replaces the on-line view. This is indicated by block 296. Surfacing the synchronized view can be done in other ways as well, and this is indicated by block 298.

It can thus be seen that, using this approach, a user very quickly receives the server side view of the user's data (e.g., the user's inbox) as soon as the user logs into the system. That view is not delayed while synchronization takes place. Instead, the view is generated of only the server side data, and when the data is actually synchronized, then a view of the synchronized data is generated and it replaces the on-line view.

Figure 6A:
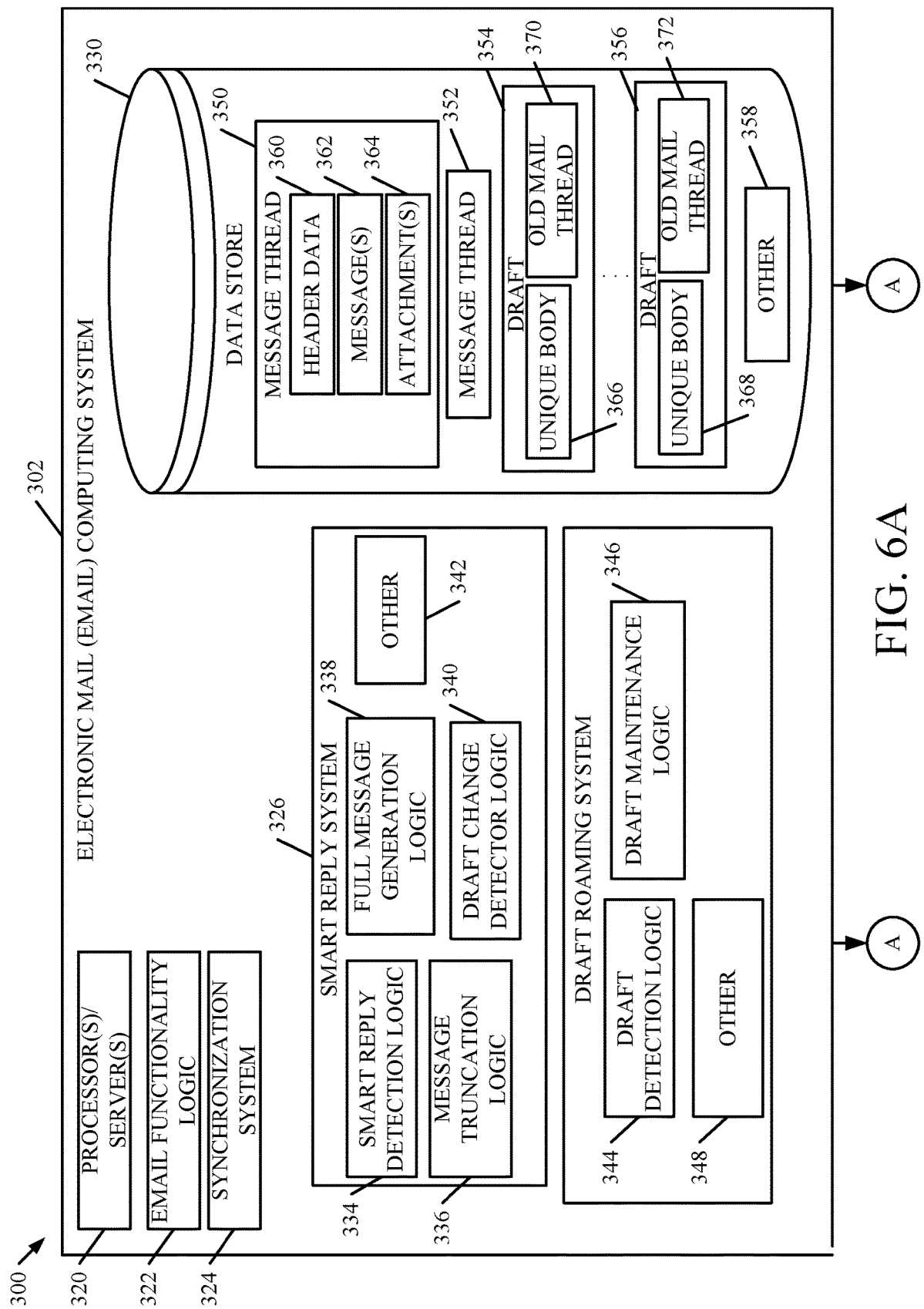
FIGS. 6A and 6B (collectively referred to herein as FIG. 6) show a block diagram of one example of an electronic mail (email) system architecture.
Figure 6B:
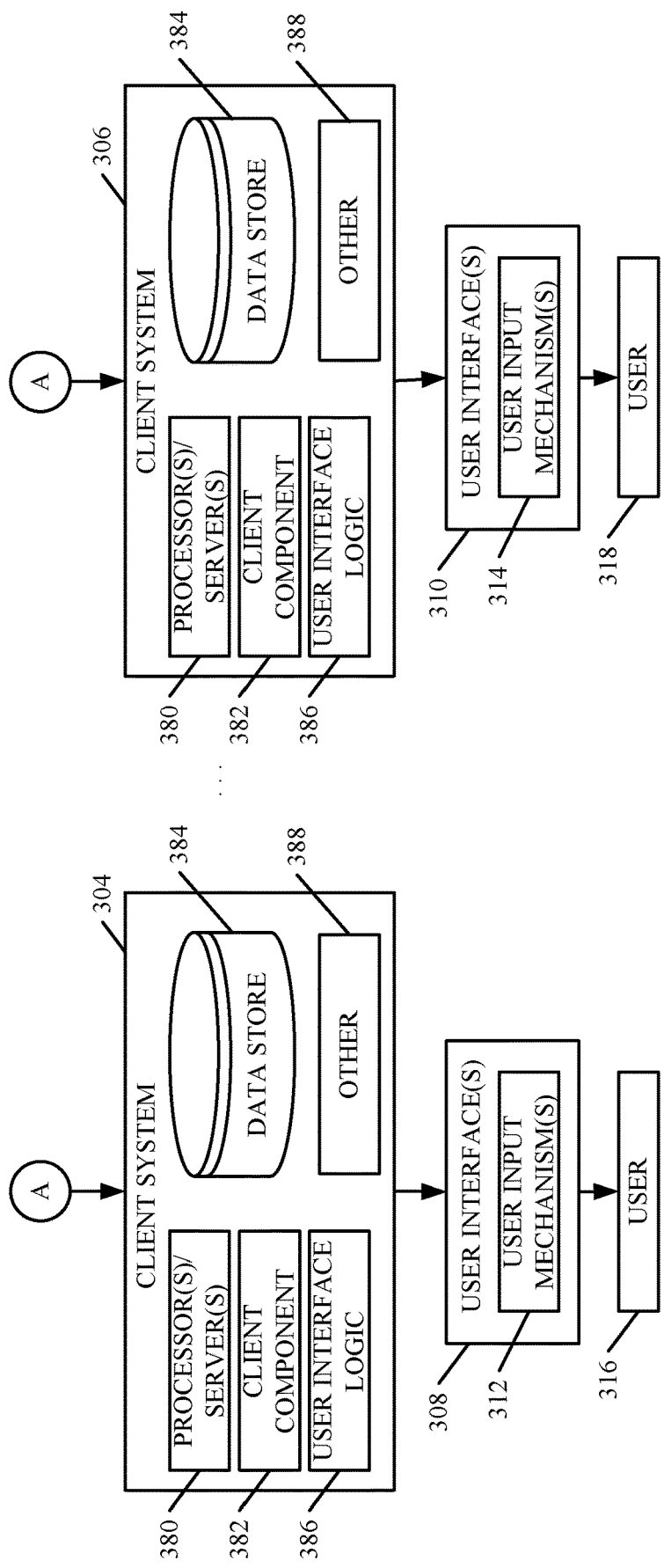

FIGS. 6A and 6B (collectively referred to herein as FIG. 6) show a block diagram showing another example of a computing system architecture 300, in which service computing system 102 is an electronic mail computing system 102. It illustratively hosts an electronic mail service for a plurality of different client systems 304-306. Each of the client systems 304-306 can generate user interfaces 308-310, with user input mechanisms 312-314 for interaction by users 316-318, respectively. The users can interact with the user input mechanisms in order to control the corresponding client systems and e-mail computing system 102. Before the operation of architecture 300 is described in more detail, a brief description of some of the items in architecture 300, and their operation, will first be described.

E-mail computing system 302 can include one or more processors or servers 320, e-mail functionality logic 322, a synchronization system 324 (which can be either first or second synchronization system 126 or 128 from FIG. 1, or a different one), smart reply system 326, draft roaming system 328, data store 330, and it can include a wide variety of other items 332.

E-mail functionality logic 322 illustratively performs functions and operations to implement the operation of e-mail computing system 302. For instance, it illustratively performs operations that allow users to draft, reply to, delete or modify e-mail messages, perform folder operations, filter operations, send and receive e-mail messages, among a wide variety of other functions.

Synchronization system 324 illustratively synchronizes the e-mail data between e-mail computing system 302 and the various client systems 304-306.

Smart reply system 326 can include smart reply detection logic 334, message truncation logic 336, full message generation logic 338, draft change detector logic 340, and it can include other items 342. Smart reply detection logic 334 detects when a user wishes to use the smart reply feature so that a user can reply to (or forward) an e-mail message without downloading the entire content of the e-mail message onto the user's device. Message truncation logic 336 then truncates the message that the user is replying to and downloads only that portion onto the client system. Full message generation logic 338 illustratively generates and maintains a full message so that when the user sends the reply, the full message can be sent to the desired recipient, and not just the truncated portion that the user downloaded. Draft change detector logic 340 detects when a draft that the user has previously worked on has changed, so that the smart reply features should not be used or so that the full message should be downloaded to the client system.

Draft roaming system 328 can include draft detection logic 344, draft maintenance logic 346, and it can include other items 348. Draft detection logic 344 detects when a user begins to draft an e-mail message (such as a reply). Draft maintenance logic 346 illustratively maintains that draft in data store 330 so that the user can have access to it, even if the user logs onto the e-mail computing system 302 using a different device. This is referred to as roaming the draft across different devices.

Data store 330 can include one or more message threads 350-352, one or more draft messages 354-356, and it can include a wide variety of other items 358. Each message thread 350 can include header data 360 that defines one or more headers in the message thread. It can also include one or more messages 362 in the thread, as well as any attachments 364 that belong to the thread.

Draft messages 354-356 can include a unique body portion 366 and 368, respectively, as well as an old mail thread portion 370-372. By way of example, assume that draft 354 is a draft that has been started by user 316 and is in reply to an old message thread. Unique body portion 366 of the draft will be that portion that the user 316 is authoring in the reply message. The old mail thread 370 will illustratively correspond to the information in a message thread 350 or 352, for example, that contains all of the prior information in that thread, to which the user is replying.

Each client system 304-306 can include one or more processors or servers 380, a client component 382, a data store 384, user interface logic 386, and it can include a wide variety of other items 388. Client component 382 may be a client component of the electronic mail system being hosted by electronic mail computing system 302. Data store 384 can store information generated or maintained by client component 382. User interface logic 386, either by itself or under the control of another item, can illustratively generate user interfaces 308 and user input mechanisms 312, and detect user interaction with them.

In overall operation, smart reply system 326 detects when a user begins typing a reply message and determines whether the user has selected to use the smart reply feature. When the reply is a draft (in that the user logs out of the computing system or navigates away from the reply before sending the reply), draft detection logic 344 detects that the reply is a draft and that the user has invoked the smart reply feature. Draft maintenance logic 346 illustratively stores the draft (such as draft 354) in data store 330 and maintains it in a way so that it is accessible by user 316 using any of a variety of other devices. In doing so, logic 346 accesses full message generation logic 338 to store the draft as a full message which includes the unique body portion 366 and the old mail thread portion 370. When the user again accesses draft 354, the unique body portion 366 can be downloaded to the client system 304 by message truncation logic 336 in smart reply system 326 so that the user still need not download the full draft message (including the old mail thread 370). Then, when the user finishes the draft and hits a send actuator, full message generation logic 338 again attaches the full message content (e.g., the old message thread 370) to the draft and sends it to the desired recipient.

Draft change detector logic 340 can detect whether the draft has changed since it was created by the user. For instance, it may be that, in the message thread, another user has include in-line comments in the old mail thread 370. In that case, when user 316 again accesses the draft 354, the full message will be downloaded to the user so that he or she can see that the old message thread has now been modified with the insertion of in-line comments.

Figure 7A:
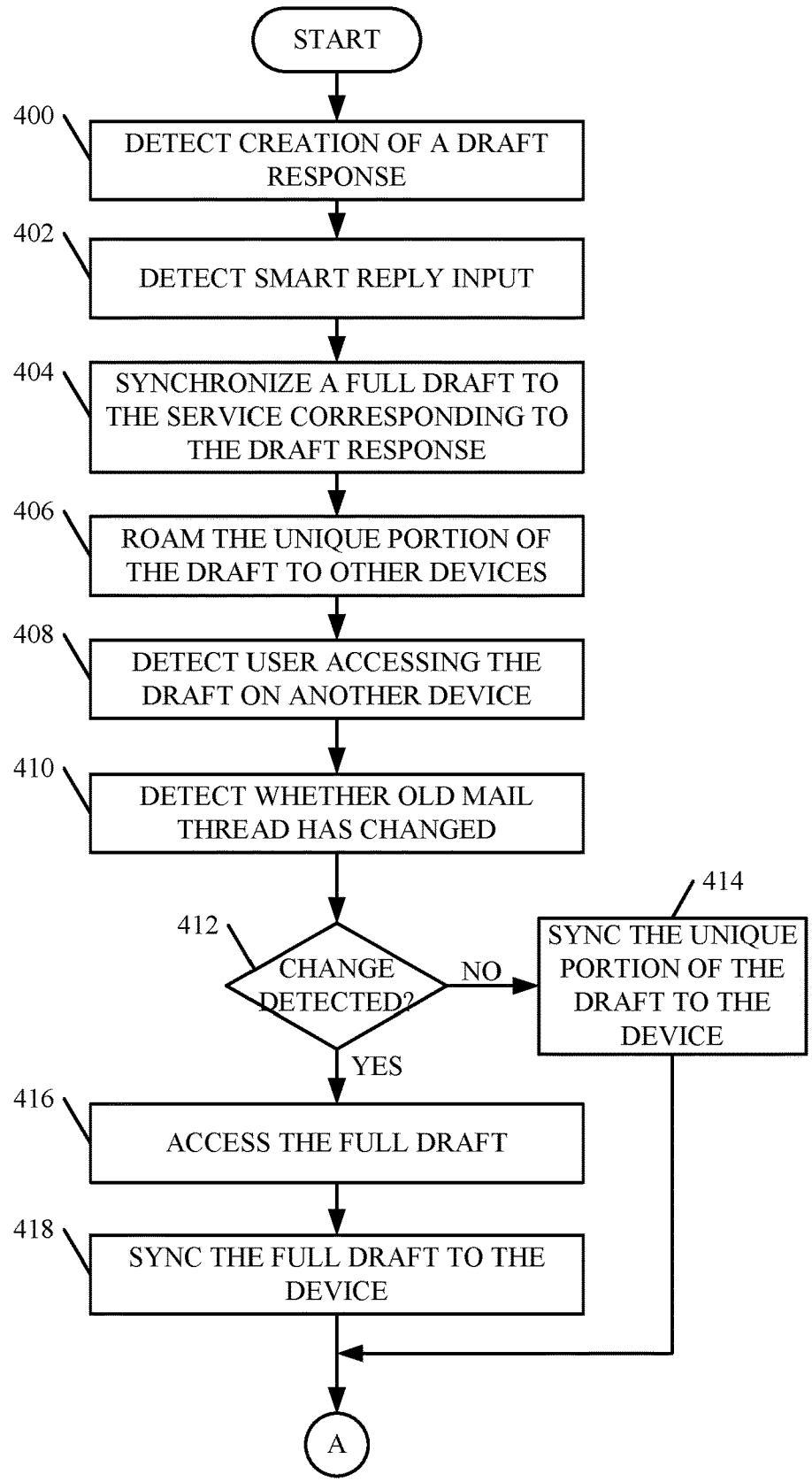
FIGS. 7A and 7B (collectively referred to herein as FIG. 7) show a flow diagram illustrating one example of an operation of the email system architecture shown in FIG. 6.
Figure 7B:
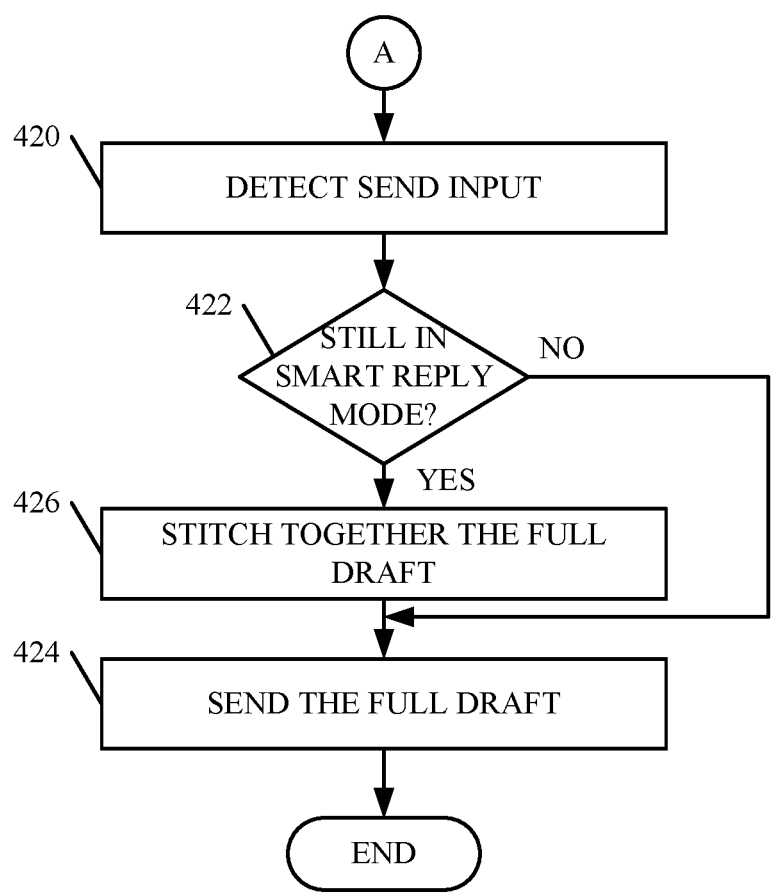

FIGS. 7A and 7B (collectively referred to herein as FIG. 7) show one example of the operation of architecture 300, shown in FIG. 6, in implementing both the smart reply feature and the draft roaming feature on the same e-mail service.

Draft detection logic 344 first detects creation of a draft response by a user of a client system 304. This is indicated by block 400 in the flow diagram of FIG. 7.

Smart reply detection logic 334 then detects that the user has invoked the smart reply feature. This is indicated by block 402. This can be done, for instance, by surfacing a user input mechanism that allows the user to choose the smart reply feature. It can be done in other ways as well.

When the user has created the draft, full message generation logic 338 generates a full message of the draft (both containing the unique body portion 366 and the old mail thread 370 and any attachments), and saves it in data store 330. This is indicated by block 404.

Draft maintenance logic 346 then roams the unique portion of the draft to other devices. This is indicated by block 406. For instance, if user 316 accesses e-mail computing system 302 using a different device, the user will have access to the unique body portion 366 in the smart reply mode as well. This is indicated by block 408.

Draft change detector logic 340 then detects whether the old mail thread has changed since the user created the draft. This is indicated by block 410. If not, then message truncation logic 336 identifies the unique body portion 366 and synchronizes that to client system 304 so the user can continue to work on the draft. This is indicated by blocks 412 and 414 in the flow diagram of FIG. 7.

However, if, at block 412, it is determined that the old mail thread has changed since the user created the draft, then full message generation logic 338 accesses the full content of the draft 354 and syncs the full draft to the new device through which the user is currently accessing e-mail computing system 302. This is indicated by blocks 416 and 418 in the flow diagram of FIG. 7.

In either case (whether the user is still accessing the draft using the smart reply feature, or whether the user is accessing the full draft), e-mail computing system 302 detects when the user actuates the send actuator to send the draft to the desired recipients. This is indicated by block 420 in the flow diagram of FIG. 7.

Smart reply detection logic 334 determines whether the draft is still being accessed in the smart reply mode as indicated by block 422. If not, then the user is already accessing the full draft and that draft is simply sent to the recipient as indicated by block 424.

However, if, at block 422, it is determined that the user is still accessing the draft in the smart reply mode, then full message generation logic 338 again forms the full content of the reply message by adding the old mail threads 370 to the unique body portion 366 (along with any attachments). Stitching together the full draft in this way is indicated by block 426 in FIG. 7. Again, the full draft is then sent as indicated by block 424.

It can thus be seen that the present description enables a single e-mail system to include not only a smart reply system 326 that implements a smart reply feature, but also to include a draft roaming system 328 that implements the draft roaming feature. This improves the computing system itself, as well as the user experience.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
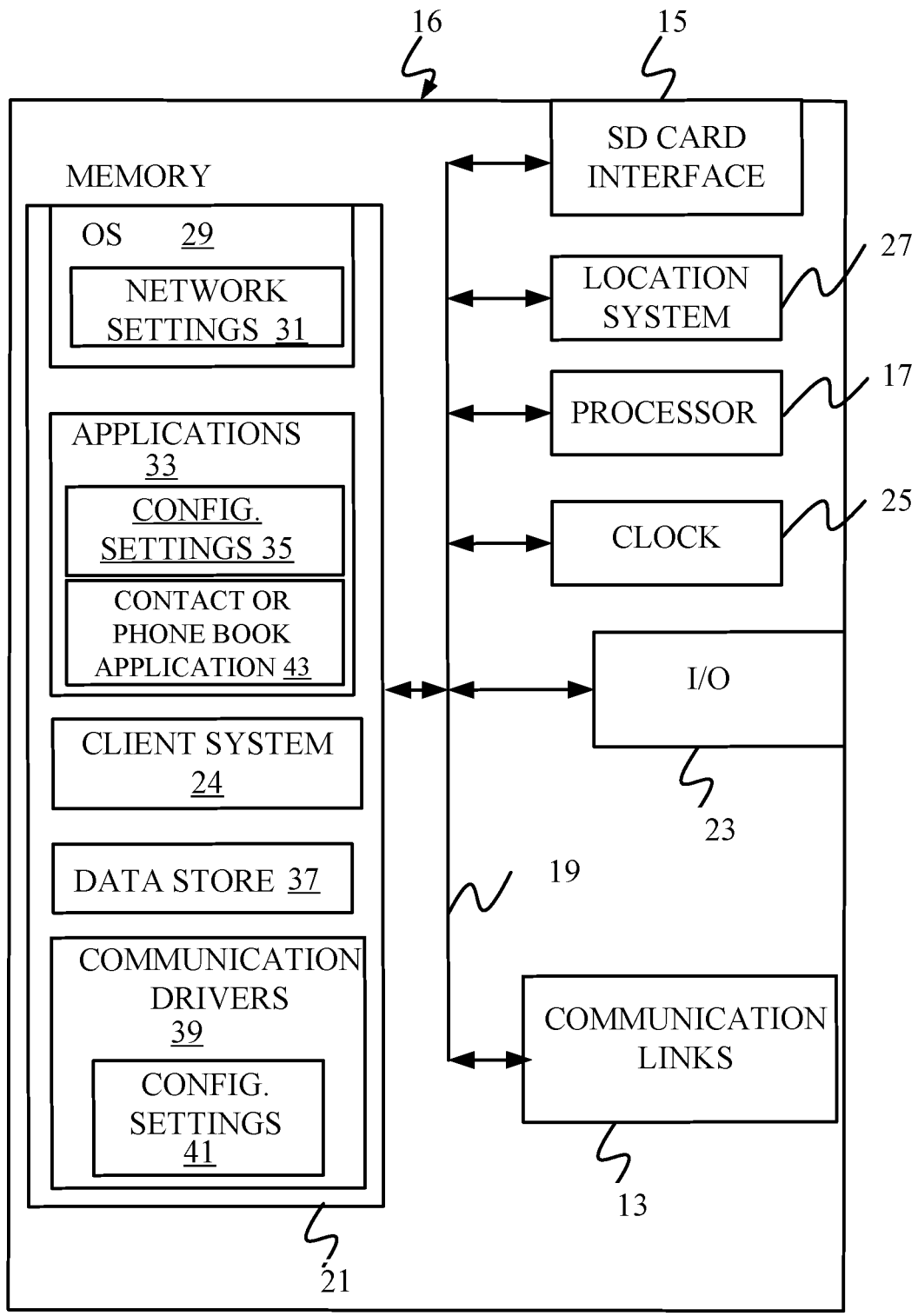
FIGS. 9-11 show examples of mobile devices that can be used in the architectures shown in the previous Figures.

FIG. 9 is a block diagram of architecture 100, shown in FIG. 1, and architecture 300 shown in FIG. 6 except that the elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architectures 100 and/or 300 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure.

Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

Figure 8:
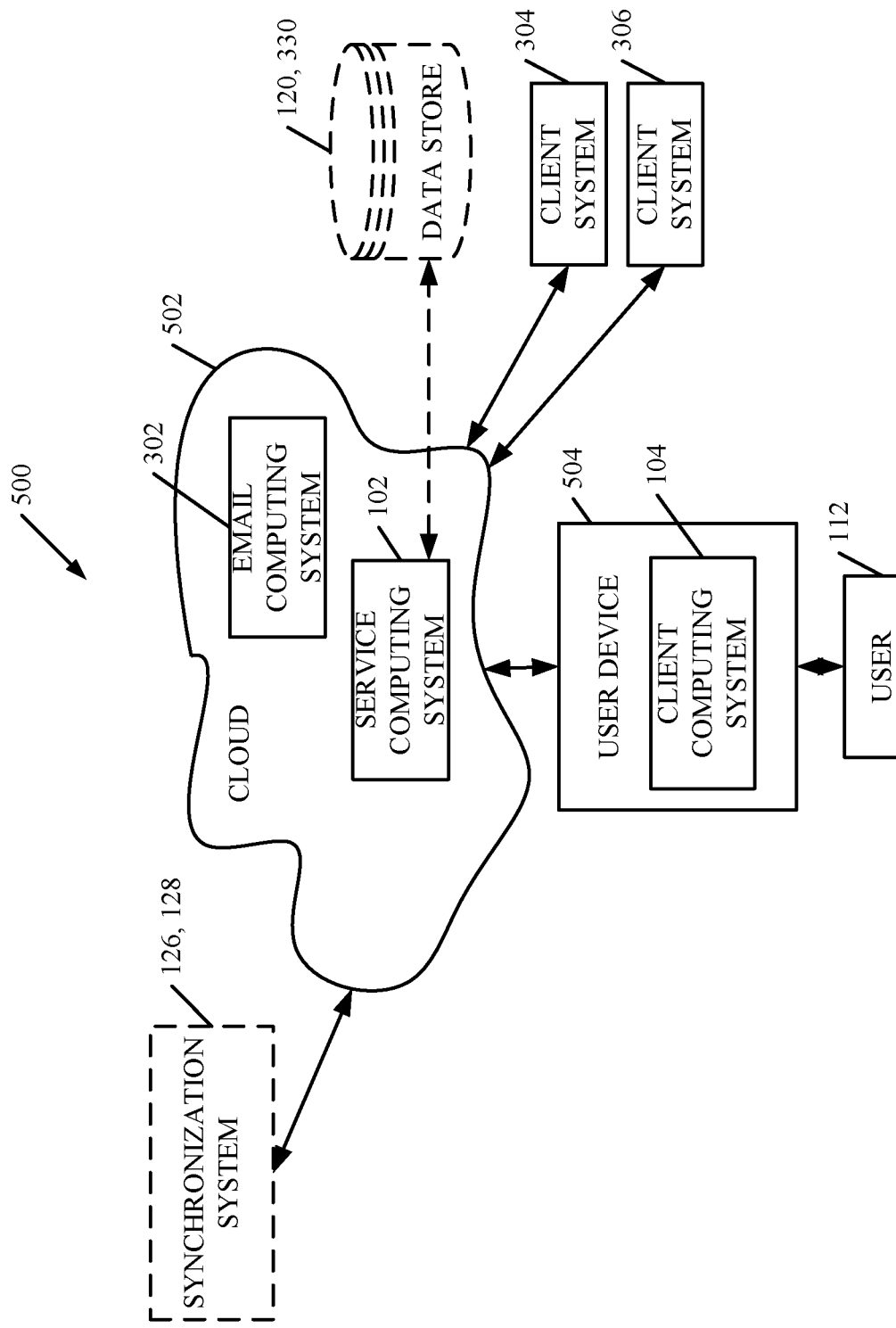
FIG. 8 is a block diagram showing one example of the architectures illustrated in FIGS. 1 and 6, deployed in a cloud computing architecture.

In the example shown in FIG. 8, some items are similar to those shown in FIGS. 1 and 6 and they are similarly numbered. FIG. 8 specifically shows that service computing system 100 and/or email computing system 302 can be located in cloud 502 (which can be public, private, or a combination where portions are public while others are private). Therefore, the users can use user devices 504 to access those systems through cloud 502.

FIG. 8 also depicts another example of a cloud architecture. FIG. 8 shows that it is also contemplated that some elements of architectures 100 and 300 can be disposed in cloud 502 while others are not. By way of example, data stores 120, 330 can be disposed outside of cloud 502, and accessed through cloud 502. In another example, synchronization system 126, 128 or other items can be outside of cloud 502. Regardless of where they are located, they can be accessed directly by devices 504, through a network (either a wide area network or a local area network), they can be hosted at a remote site by a service, or they can be provided as a service through a cloud or accessed by a connection service that resides in the cloud. All of these architectures are contemplated herein.

It will also be noted that architectures 100 and/or 300, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
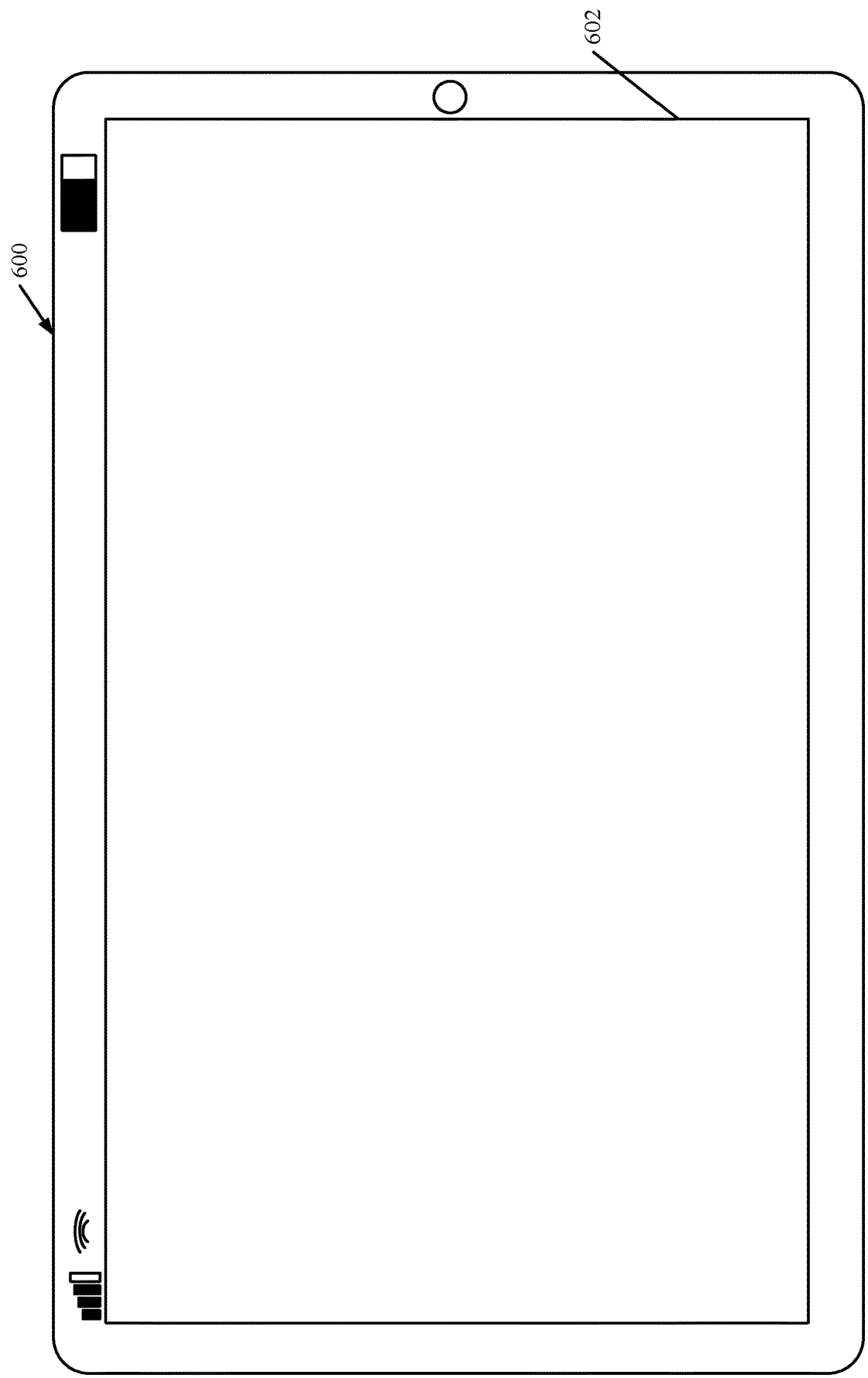
Figure 11:
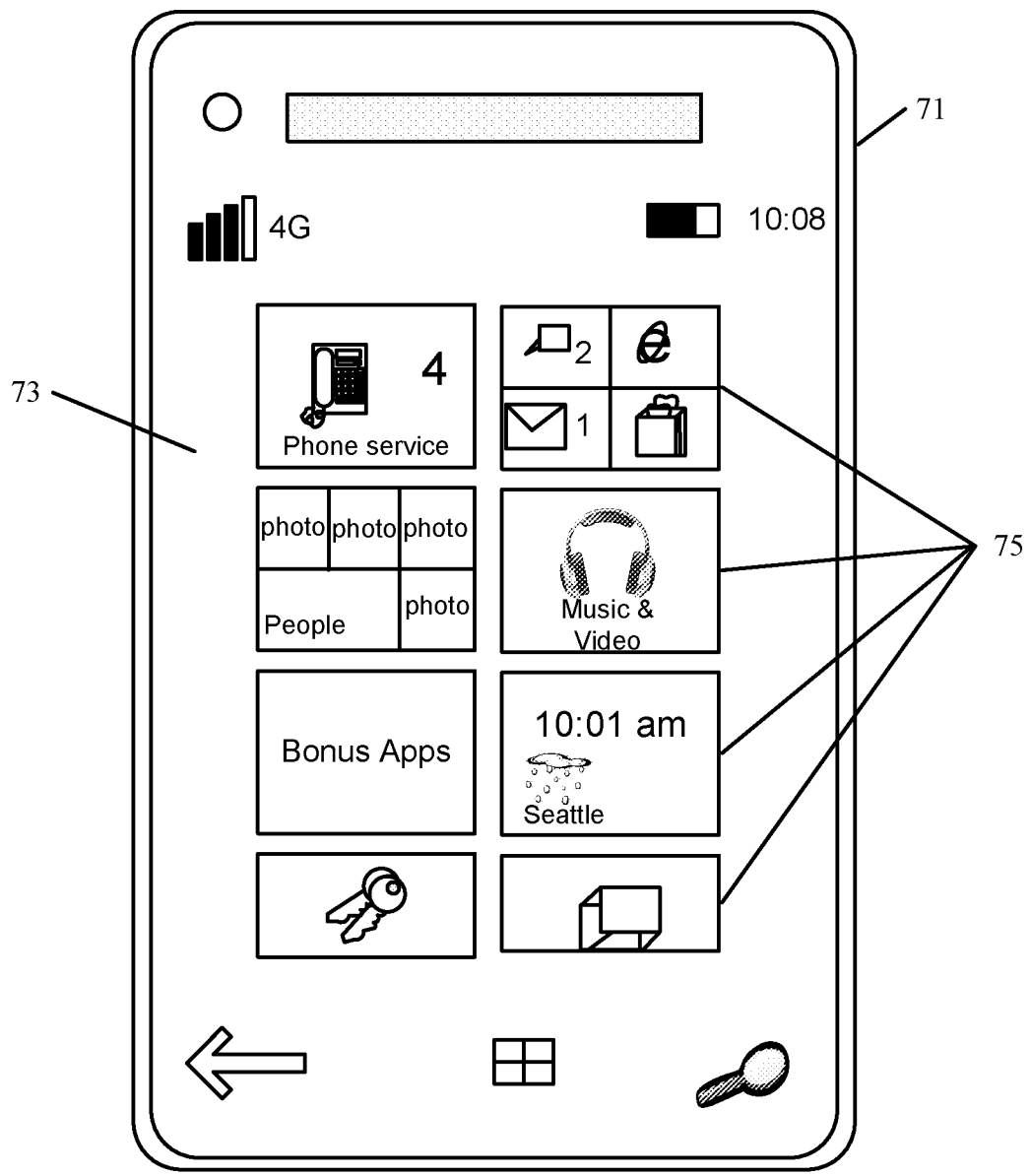

FIG. 9 is a simplified block diagram of one illustrative embodiment of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components of architecture 100, 300 or that interacts with architectures 100, 300, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of client systems 104, 304, 306. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one embodiment in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
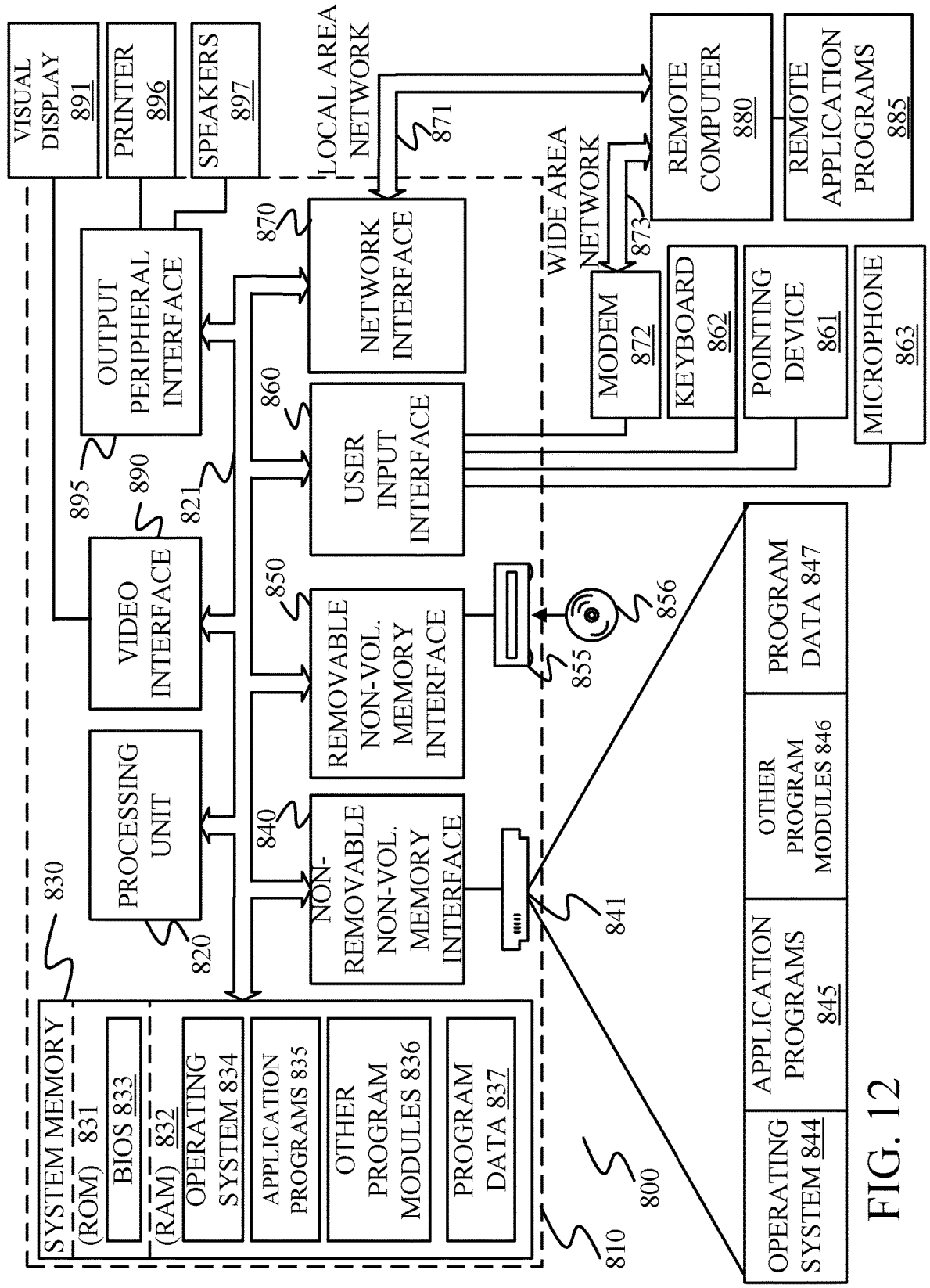
FIG. 12 is a block diagram showing one example of a computing environment that can be used in the architectures shown in the previous Figures.

FIG. 12 is one example of a computing environment in which architecture 100 and/or 300, or parts of them, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and/or 6 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

electronic mail (email) functionality on an email service that determines that a user is generating, on a first client device, a draft response to an email message in a mailbox for the user, the email message including a full content portion;

a smart reply system that truncates the email message, to obtain a truncated email message that is less than the full content portion of the email message, and sends the truncated email message to the first client device for generation of the draft response; and a draft roaming system that saves the draft response on the email service for access by the user from a second client device, the smart reply system sending the truncated message and a unique portion of the draft response, entered in the draft response, to the second client device in response to detection of the user accessing the draft response from the second client device.

Example 2 is the computing system of any or all previous examples wherein the smart reply system comprises:

full message generation logic configured to detect actuation of a send actuator to send the draft response and to generate a full message including the unique portion of the draft response and the full content portion of the email message, the email functionality sending the full message.

Example 3 is the computing system of any or all previous examples wherein the smart reply system comprises:

message truncation logic configured to generate the truncated message; and smart reply detection logic configured to detect a smart reply input from the first client device and, in response, control the message truncation logic to generate the truncated message.

Example 4 is the computing system of any or all previous examples wherein the smart reply system comprises:

draft change detector logic configured to detect a change in the full content portion of the draft response and control the draft roaming system to send the full content portion of the draft response, along with the unique portion, to the second client device in response to detection of the user accessing the draft response from the second client device.

Example 5 is the computing system of any or all previous examples wherein the draft roaming system comprises:

draft maintenance logic configured to save the draft response on the email service as a draft in the mailbox for the user with a smart reply indicator indicating that the smart reply input, corresponding to the draft response, was detected by the smart reply detection logic.

Example 6 is the computing system of any or all previous examples and further comprising:

a data store storing the draft response, accessible by the first and second client devices.

Example 7 is the computing system of any or all previous examples wherein the full content portion of the email message comprises a mail thread portion indicative of a full message thread corresponding to the email message, and an attachment, and wherein the full message generation logic is configured to detect actuation of the send actuator to send the draft response and to generate the full message including the unique portion of the draft response, the mail thread portion and the attachment.

Example 8 is a computer implemented method, comprising:

detecting, on an email server, that a user is generating, on a first client device, a draft response to an email message in a mailbox for the user, the email message including a full content portion;

truncating the email message, to obtain a truncated email message that is less than the full content portion of the email message, on the email server;

sending the truncated email message to the first client device for generation of the draft response;

saving the draft response on the email server for access by the user from a second client device;

detecting, on the email server, the user accessing the draft response from the second client device; and sending the truncated message and a unique portion of the draft response, entered in the draft response, to the second client device in response to detecting the user accessing the draft response from the second client device.

Example 9 is the computer implemented method of any or all previous examples and further comprising:

detecting, at the email server, actuation of a send actuator, on the second client device, to send the draft response;

generating, at the email server, a full message including the unique portion of the draft response and the full content portion of the email message; and sending the full message to a recipient.

Example 10 is the computer implemented method of any or all previous examples and further comprising:

detecting a smart reply input from the first client device; and in response, generating the truncated message.

Example 11 is the computer implemented method of any or all previous examples and further comprising:

detecting the user accessing the draft response from the second client device;

detecting a change in the full content portion of the draft response; and sending the full content portion of the draft response, along with the unique portion, to the second client device.

Example 12 is the computer implemented method of any or all previous examples wherein saving the draft response on the email server comprises:

saving the draft response on the email service as a draft in the mailbox for the user with a smart reply indicator indicating that the smart reply input, corresponding to the draft response, was detected.

Example 13 is the computer implemented method of any or all previous examples and further comprising:

storing the draft response in a cloud-based data store, accessible by the first and second client devices through the email server.

Example 14 is the computer implemented method of any or all previous examples wherein the full content portion of the email message comprises a mail thread portion indicative of a full message thread corresponding to the email message, and an attachment, and wherein generating the full message comprises:

detecting actuation of the send actuator to send the draft response; and generating the full message including the unique portion of the draft response, the mail thread portion and the attachment.

Example 15 is a computing system, comprising:

electronic mail (email) functionality on a hosted email service that determines that a user is generating, on a first client device, a draft response to an email message in a mailbox for the user, the email message including a full content portion;

a smart reply system that truncates the email message, to obtain a truncated email message that is less than the full content portion of the email message, and sends the truncated email message to the first client device for generation of the draft response;

a draft roaming system that saves the draft response on the hosted email service for access by the user from a second client device, the smart reply system sending the truncated message and a unique portion of the draft response, entered in the draft response, to the second client device in response to detection of the user accessing the draft response from the second client device; and full message generation logic configured to detect actuation of a send actuator to send the draft response and to generate a full message including the unique portion of the draft response and the full content portion of the email message, the email functionality sending the full message.

Example 16 is the computing system of any or all previous examples wherein the smart reply system comprises:

message truncation logic configured to generate the truncated message; and smart reply detection logic configured to detect a smart reply input from the first client device and, in response, control the message truncation logic to generate the truncated message.

Example 17 is the computing system of any or all previous examples wherein the smart reply system comprises:

draft change detector logic configured to detect a change in the full content portion of the draft response and control the draft roaming system to send the full content portion of the draft response, along with the unique portion, to the second client device in response to detection of the user accessing the draft response from the second client device.

Example 18 is the computing system of any or all previous examples wherein the draft roaming system comprises:

draft maintenance logic configured to save the draft response on hosted the email service as a draft in the mailbox for the user with a smart reply indicator indicating that the smart reply input, corresponding to the draft response, was detected by the smart reply detection logic.

Example 19 is the computing system of any or all previous examples and further comprising:

a cloud-based data store storing the draft response, accessible by the first and second client devices through the hosted email service.

Example 20 is the computing system of any or all previous examples wherein the full content portion of the email message comprises a mail thread portion indicative of a full message thread corresponding to the email message, and an attachment, and wherein the full message generation logic is configured to detect actuation of the send actuator to send the draft response and to generate the full message including the unique portion of the draft response, the mail thread portion and the attachment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

at least one processor; and memory storing instructions executable by the at least one processor, wherein the instructions, when executed, configure the computing system to provide:

electronic mail (email) functionality on an email service, the email functionality configured to receive an indication that a user is generating, on a first client device, a second email message comprising a response to a first email message in a mailbox for the user, the first email message including a first content portion and a second content portion;

a smart reply system configured to:

truncate the first email message, to obtain a truncated email message that includes the first content portion and omits the second content portion, and send, from the email service to the first client device, the truncated email message for generation of a draft of the second email message on the first client device; and a draft roaming system configured, to:

receive, from the first client device, an indication of a unique portion entered in the draft of the second email message by the user on the first client device; and save the draft of the second email message, including the unique portion, on the email service for access by the user from a second client device, wherein the smart reply system is configured to:

in response to detection of the user accessing the draft of the second email message from the second client device, and before the second email message is sent to a recipient, send the truncated email message and the unique portion to the second client device, and wherein the email functionality is configured to:

based on detection of actuation of a send actuator, send the second email message to the recipient.

2. The computing system of claim 1 wherein the smart reply system comprises full message generation logic configured to:

in response to detection of actuation of the send actuator on the second client device, generate a full email message including the unique portion of the draft of the second email message and the full content portion of the first email message, and the email functionality is, configured to send the full email message to the recipient.

3. The computing system of claim 2 wherein the smart reply system comprises:

message truncation logic configured to generate the truncated email message; and smart reply detection logic configured to detect a smart reply input from the first client device and, in response, control the message truncation logic to generate the truncated email message.

4. The computing system of claim 3 wherein the draft roaming system comprises:
   draft maintenance logic configured to save the draft of the second email message on the email service as a draft in the mailbox for the user with, a smart reply indicator indicating that the smart reply input, corresponding to the draft of the second email message, was detected by the smart reply detection logic.

5. The computing system of claim 4 and further comprising:
   a data store storing the draft of the second email message, accessible by the first and second client devices.

6. The computing system of claim 5 wherein the full content portion of the first email message comprises a mail thread portion indicative of a full message thread corresponding to the first email message, and an attachment, and wherein the full email message generation logic is configured to detect actuation of the send actuator to send the second email message and to generate the full email message including the unique portion of the draft of the second email message, the mail thread portion and the attachment.

7. The computing system of claim 3 wherein the smart reply system comprises:
   draft change detector logic configured to detect a change in the full content portion of the draft of the second email message and control the draft roaming system to send the full content portion of the draft of the second email, along with the unique portion, to the second client device in response to detection of the user accessing the draft of the second email message from the second client device.

8. A computer implemented method, comprising:
   detecting, by an email server, that a user is generating a second email message on a first client device, the second email message comprising a response to a first email message in a mailbox for the user, the first email message including a first content portion and a second content portion;
   truncating the first email message, to obtain a truncated email message that includes the first content portion and omits the second content portion;
   sending, from the email server to the first client device, the truncated email message for generation of a draft of the second email message on the first client device;
   receiving, from the first client device, an indication of a unique portion entered in the draft of the second email message by the user on the first client device;
   saving the draft of the second email message, including the unique portion, on the email server for access by the user from a second client device; and
   in response to detecting, on the email server, the user accessing the draft of the second email message, from the second client device,
      sending the truncated email message and the unique portion, entered in the draft of the second email message, to the second client device.

9. The computer implemented method of claim 8 and further comprising:
   detecting, at the email server, actuation of a send actuator, on the second client device, to send the second email message;
   generating, at the email server, a full email message including the unique portion of the draft response and the full content portion of the email message; and
   sending the full email message to a recipient.

10. The computer implemented method of claim 9 and further comprising:
   detecting a smart reply input from the first client device; and
   in response, generating the truncated email message.

11. The computer implemented, method of claim 10 wherein saving the draft response on the email server comprises:
   saving the draft of the second email message on the email service as a draft in the mailbox for the user with a smart reply indicator indicating that the smart reply input, corresponding to the draft, was detected.

12. The computer implemented method of claim 11 and further comprising:
   storing the draft of the second email message in a cloud-based data store, accessible by the first and second client devices through the email server.

13. The computer implemented method of claim 12 wherein the full content portion of the first email message comprises a mail thread portion indicative of a full message thread corresponding to the first email message, and an attachment, and wherein generating the full email message comprises:
   detecting actuation of the send actuator to send the second email message; and
   generating the full email message including the unique portion of the second email message, the mail thread portion and the attachment.

14. The computer implemented method of claim 10 and further comprising:
   detecting the user accessing the draft of the second email message from the second client device;
   detecting a change in the full content portion of the draft; and
   sending the full content portion of the draft, along with the unique portion, to the second client device.

15. A computing system, comprising:
   at least one processor; and
   memory storing instructions executable by the at least one processor, wherein the instructions, when executed, configure the computing system to:
      determine, by electronic mail (email) functionality on a hosted email service, that a user is generating, on a first client device, a second email message comprising a response to a first email message in a mailbox for the user, the first email message including a first content portion and a second content portion;
      truncate the first email message, to obtain a truncated email message that includes the first content portion and omits the second content portion;
      send, from the hosted email service to the first client device, the truncated email message for generation of a draft of the second email message on the first client device;
      receive, from the first client device, an indication of a unique portion entered in the draft of the second email message by the user on the first client device;
      save the draft of the second email message, including the unique portion, on the hosted email service for access by the user from a second client device;
      send the truncated email message and the unique portion, entered in the draft of the second email message, to the second client device in response to detection of the user accessing the draft response from the second client device; and
      based on detecting actuation of a send actuator to send the draft response generate a full email message including the unique portion of the draft the second email message and the first and second content portions of the first email message, and send the full email message to a recipient.

16. The computing system of claim 15 wherein the instructions configure the computing system to:

generate the truncated email message; and in response to a smart reply input from the first client device, generate the truncated email message.

17. The computing system of claim 16 wherein the instructions configure the computing system to:

detect a change in the second content portion of the draft of the second email message; and control the draft roaming system to send the second content portion of the draft of the second email message, along with the unique portion, to the second client device in response to detection of the user accessing the draft of the second email message from the second client device.

18. The computing system of claim 17 wherein the instructions configure the computing system to:

save the draft of the second email message on hosted the email service as a draft in the mailbox for the user with a smart reply indicator indicating that the smart reply input, corresponding to the draft of the second email message, was detected.

19. The computing system of claim 18 wherein the instructions configure the computing system to:

store, in a cloud-based data store, the draft of the second email message accessible by the first and second client devices through the hosted email service.

20. The computing system of claim 19 wherein the first email message comprises a mail thread portion indicative of a lull message thread come spending to the first email message, and an attachment, and wherein the instructions configure the computing system to:

detect actuation of the send actuator to send the draft of the second email message; and get rate the full email message including the unique portion of the draft of the second email message, the mail thread portion, and the attachment.

* * * * *